S. R. BURTON, J. T. PEET & W. CAVEN.
Long-Center and Reservoir-Cover for Stoves.

No. 215,716. Patented May 27, 1879.

Attest.
C. H. Bosworth.
Jno. W. Frehli.

Inventors
Stephen R. Burton,
John T. Peet and
William Caven,
per Wm. Hubbell Fisher,
Atty.

UNITED STATES PATENT OFFICE.

STEPHEN R. BURTON, OF AVONDALE, AND JOHN T. PEET AND WILLIAM CAVEN, OF CINCINNATI, ASSIGNORS TO REDWAY & BURTON, OF CINCINNATI, OHIO.

IMPROVEMENT IN LONG-CENTER AND RESERVOIR-COVER FOR STOVES.

Specification forming part of Letters Patent No. 215,716, dated May 27, 1879; application filed February 6, 1879.

*To all whom it may concern:*

Be it known that we, STEPHEN R. BURTON, of the village of Avondale, Hamilton county, Ohio, and JOHN T. PEET and WILLIAM CAVEN, of the city of Cincinnati, Hamilton county, Ohio, have invented certain new and useful Improvements in Long-Center and Reservoir-Cover for Stoves, of which the following is a specification.

Our invention consists in certain improvements, both new and useful, in stoves, the advantages and peculiarities of which will be more particularly hereinafter described.

Figure 2:
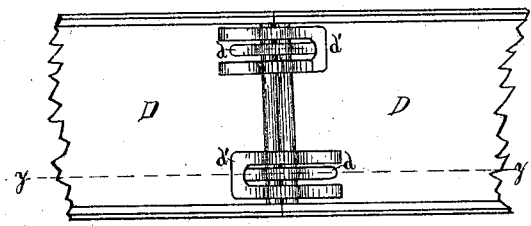
Figure 1:
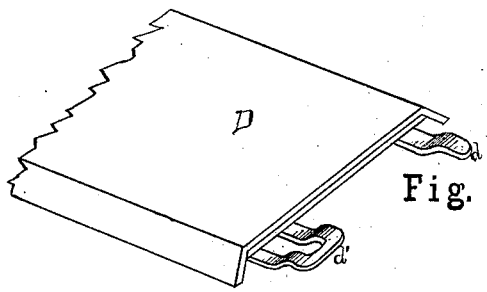
Figure 3:
Figures 4, 5:
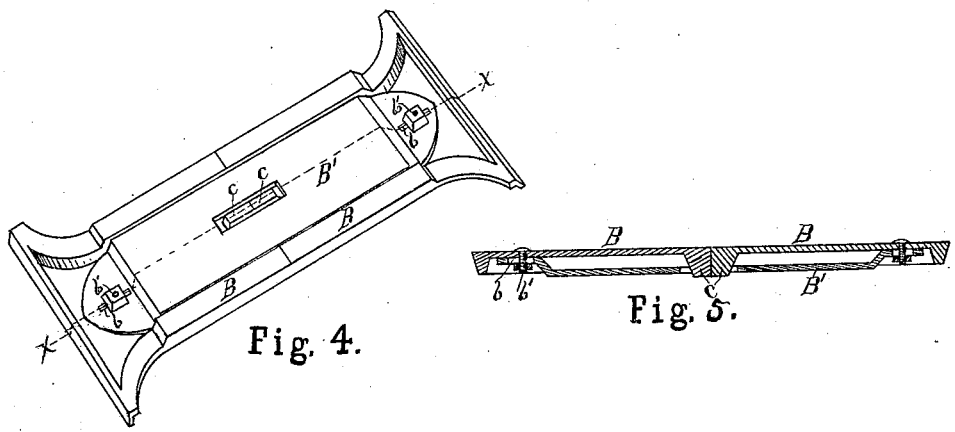

In the accompanying drawings, forming a part of this specification, Figure 1 is a perspective view of one half of our reservoir-cover, both halves of which are cast from one pattern. Fig. 2 is a plan view of the under surface of the cover as it appears when both halves are in position with respect to one another. Fig. 3 is a section view taken through the line $y\ y$, Fig. 2. Fig. 4 is a perspective view of our special form of long-center. Fig. 5 is a section through the line $x\ x$, Fig. 4.

Figs. 1, 2, 3 show our special form of reservoir-cover to be used in connection with a stove.

Heretofore it has been a difficult matter in ordering only one half of the cover for persons to tell which side was wanted, as each half was made for its particular side; but in our cover both halves are cast from the same pattern, and will consequently fit either.

D represents one half of the cover, broken off at the outer end. It is provided with the tongue $d$ and the loop $d^1$, which are bent as shown best in section in Fig. 3.

When the two halves are to be placed together, the tongue $d$ of each half is inserted through the loop of the other half from above downward, and the two halves allowed to fall into position. The tongues and loops are then in the position shown in Figs. 2, 3.

The two halves are prevented from being separated, when in position, by the shape of the tongues and loops, which are bent so as to fit over the ridges $d^2$ along the under surface of the edge of either half.

By constructing covers in the manner described but one pattern is needed, and confusion is avoided in ordering when only one half is needed.

Our long-center is shown in Figs. 4, 5. We provide one constructed in two parts, B B, having a lining, and at the same time admitting of expansion and contraction under the influence of heat.

Fig. 4 shows the under side of our long center, of which B' is the lining, provided at either end with the slots $b$, through which pass bolts $b'$, projecting from the under surface of the long-center, and securing the lining in position by means of nuts screwed on the ends of the bolts.

From the under side of the parts B B project lugs $c$, which pass through a slot in the lining B', and rest upon a support springing from the top oven-plate. These lugs prevent the long-center from sagging in the middle, and by passing through the slot in the lining B' they prevent lateral motion of the two halves.

Having thus described our invention, we claim, and desire to secure by Letters Patent of the United States, the following:

1. A reservoir-cover constructed in two halves, each half provided with a tongue, $d$, and a loop, $d^1$, substantially as and for the purposes set forth.

2. In combination with a continuous lining, the stove-center divided into two halves, each half being provided at its inner end with a lug, $c$, which passes through a slot in the lining, and is adapted to rest on a support projecting upward from the stove, substantially as and for the purposes set forth.

3. In combination with a continuous lining provided with slots $b\ b$, the stove-center connected to the lining by bolts passing through the said slots and divided into two halves, each half being provided at its inner end with a lug, $c$, which passes through a slot in the lining, and is adapted to rest on a support projecting upward from the stove, substantially as and for the purposes specified.

STEPHEN R. BURTON.
JOHN T. PEET.
WM. CAVEN.

Attest:
C. H. BOSWORTH,
JAMES McNAMARA.